(12) United States Patent
Trivedi et al.

(10) Patent No.: US 11,656,955 B1
(45) Date of Patent: May 23, 2023

(54) DATABASE TABLE VALUATION

(71) Applicant: Bank of America Corporation, Charlotte, NC (US)

(72) Inventors: Praveen Kumar Trivedi, Gandhinagar (IN); Venugopala Rao Randhi, Hyderabad (IN); Anshuman Mohanty, Hyderabad (IN); Ritesh Kumar Dash, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/656,150

(22) Filed: Mar. 23, 2022

(51) Int. Cl.
*G06F 12/00* (2006.01)
*G06F 11/14* (2006.01)
*G06F 11/34* (2006.01)

(52) U.S. Cl.
CPC ...... *G06F 11/1469* (2013.01); *G06F 11/1448* (2013.01); *G06F 11/1456* (2013.01); *G06F 11/3428* (2013.01)

(58) Field of Classification Search
CPC ............. G06F 11/1469; G06F 11/1448; G06F 11/1456; G06F 11/3428; G06F 3/065; G06F 12/00; G06F 16/00
See application file for complete search history.

(56) References Cited

U.S. PATENT DOCUMENTS

| | | |
|---|---|---|
| 6,871,271 B2 | 3/2005 | Ohran et al. |
| 6,898,688 B2 | 5/2005 | Martin et al. |
| 7,024,527 B1 | 4/2006 | Ohr |
| 7,194,487 B1 | 3/2007 | Kekre et al. |
| 7,237,075 B2 | 6/2007 | Welsh et al. |
| 7,237,080 B2 | 6/2007 | Green et al. |
| 7,266,574 B1 | 9/2007 | Boudrie et al. |
| 7,266,655 B1 | 9/2007 | Escabi, II et al. |
| 7,310,654 B2 | 12/2007 | Mcneil |
| 7,340,645 B1 | 3/2008 | Martin et al. |

(Continued)

FOREIGN PATENT DOCUMENTS

| | | |
|---|---|---|
| AU | 2010266433 B2 | 2/2013 |
| AU | 2013347798 B2 | 1/2017 |

(Continued)

OTHER PUBLICATIONS

Trivedi, P. K. et al., "Table Prioritization for Data Copy in a Multi-Environment Setup," U.S. Appl. No. 17/656,060, filed Mar. 23, 2022, 56 pages.

*Primary Examiner* — Shawn X Gu

(57) ABSTRACT

A system includes one or more source memory devices of a source computing environment that store a database comprising data files grouped in a plurality of file groups, wherein each of a plurality of data tables of the source computing environment includes data from one or more of the data files grouped into one or more of the file groups, one or more target memory devices of a target computing environment and at least one processor configured to calculate a number of read operations per megabyte (MB) for a data table, a number of write operations per MB, obtain an importance index of the table, weight the reads per MB, writes per MB and the importance index by respective user-defined weights, determine a criticality index of the table, calculate a value coefficient of the table, and assign a data file based on the value coefficient of the table.

20 Claims, 6 Drawing Sheets

(56) References Cited

U.S. PATENT DOCUMENTS

| | | |
|---|---|---|
| 7,620,785 B1 | 11/2009 | Coulter et al. |
| 7,739,464 B1 | 6/2010 | Coulter et al. |
| 7,743,227 B1 | 6/2010 | Colgrove et al. |
| 7,865,471 B1 | 1/2011 | Stagg |
| 7,979,742 B2 | 7/2011 | Uysal et al. |
| 8,095,511 B2 | 1/2012 | Zwilling et al. |
| 8,965,850 B2 | 2/2015 | Varadarajan |
| 9,003,282 B2 | 4/2015 | Baer et al. |
| 9,098,364 B2 | 8/2015 | Davis |
| 9,213,706 B2 | 12/2015 | Long et al. |
| 9,280,591 B1 | 3/2016 | Kharatishvili et al. |
| 9,792,321 B2 | 10/2017 | Buehne et al. |
| 9,805,070 B2 | 10/2017 | Buehne et al. |
| 9,852,197 B2 | 12/2017 | Bender |
| 10,216,584 B2 | 2/2019 | Bourbonnais et al. |
| 10,353,913 B2 | 7/2019 | Dhayapule et al. |
| 10,540,335 B2 | 1/2020 | Buehne et al. |
| 10,579,610 B2 | 3/2020 | Kharatishvili et al. |
| 10,642,840 B1 | 5/2020 | Attaluri et al. |
| 10,732,960 B2 | 8/2020 | Kannan et al. |
| 10,776,244 B2 | 9/2020 | Davis et al. |
| 10,831,614 B2 | 11/2020 | Sanocki et al. |
| 10,942,814 B2 | 3/2021 | Chu et al. |
| 10,963,350 B2 | 3/2021 | Bangalore et al. |
| 11,042,503 B1 | 6/2021 | Vig et al. |
| 11,068,501 B2 | 7/2021 | Gupta et al. |
| 11,080,253 B1 * | 8/2021 | Leshinsky ............ G06F 16/2272 |
| 11,210,184 B1 | 12/2021 | Jianto et al. |
| 2009/0055418 A1 | 2/2009 | Megerian |
| 2020/0104052 A1 * | 4/2020 | Vijayan .................... G06F 11/00 |
| 2020/0186602 A1 | 6/2020 | Leshinsky et al. |
| 2021/0263888 A1 * | 8/2021 | Hammer ................ G06F 16/125 |

FOREIGN PATENT DOCUMENTS

| | | |
|---|---|---|
| EP | 1461700 B1 | 8/2006 |
| EP | 3019980 B1 | 3/2020 |

\* cited by examiner

| | Table 1 | | KPI-3 | KPI/Column | Criticality Calculation | Criticality Index |
|---|---|---|---|---|---|---|
| ColA | ColB | ColC | | (3/3) | ((3/3)*3)/10 + Table 2 | 1 |
| | Table 2 | | KPI-4 | | | |
| ColW | ColX | ColY ColZ = ColA + ColC | | (4/4) | ((4/4)*4)/10 + Table 3 | 0.7 |
| | Table 3 | | KPI-3 | | | |
| ColG | ColH = ColZ + ColX | | | (3/2) | ((3/2)*2)/10 | 0.3 |
| | Table 4 | | KPI-4 | | | |
| ColS | ColT | | | (4/2) | ((4/2)*2)/10 | 0.4 |

*FIG. 2*

| Value Coefficient Calculation |||||||
|---|---|---|---|---|---|---|
| Table Name | ReadPerMB | WritePerMb | KPI Index | Criticality Index | Value Coefficient | Priority Index |
| Table A | 0.23625734 | 0.05369485 | 0.4 | 0.4 | 0.561350361 | 2 |
| Table B | 0.36040625 | 0.200225694 | 1 | 0.2 | 0.544275347 | 3 |
| Table C | 0.40011811 | 0.160047246 | 1 | 0.1 | 0.440070869 | 5 |
| Table D | 0.26620572 | 0.354940956 | 0.6 | 0.3 | 0.643952764 | 1 |
| Table E | 0 | 0 | 0.8 | 0.4 | 0.48 | 4 |

*FIG. 3A*

| User Defined Weightage ||||
|---|---|---|---|
| Read Weightage | Write Weightage | KPI Weightage | StaleDataMovement Flag |
| 0.4 | 0.5 | 0.1 | Y |

*FIG. 3B*

DATABASE TABLE VALUATION

TECHNICAL FIELD

The present disclosure relates generally to data processing, and more specifically to database table valuation.

BACKGROUND

In a multi-environment system, a target computing environment often undergoes periodic restoration which includes copying data stored in one or more source memory devices of a source computing environment to one or more target memory devices of the target computing environment. Each restoration event essentially creates an image of the source computing environment in the target computing environment. A common error associated with copying data between computing environments (e.g., source computing environment to target computing environment) in a multi-environment system is a restoration failure or abort as a result of the target environment having insufficient memory space for copying all data from the source environment. In most such failure events, even if the target memory devices have sufficient memory space to accommodate all critical data files (e.g., critical data tables) needed for operating the target environment, a data restoration may still fail as presently no mechanism exists to selectively copy the critical data files first before the target memory devices run out of memory space.

SUMMARY

The system and methods implemented by the system as disclosed in the present disclosure provide techniques for automatically and intelligently prioritizing data tables of a database and copying data relating to higher priority data tables before copying data relating to lower priority data tables. The disclosed system and methods provide several practical applications and technical advantages.

For example, the disclosed system and methods provide the practical application of automatically and intelligently prioritizing data tables and file groups of a database at a source computing environment based on pre-defined metrics so that data files associated with critical data tables are prioritized during a data copy to a target computing environment. As described in accordance with embodiments of the present disclosure a copy manager determines a value coefficient for each data table of a database based at least on table metadata and user-defined metrics related to the data table. A priority index is assigned to each data table based on the value coefficient of the data table, wherein a higher priority index is assigned to a data table having a higher value coefficient. The copy manager schedules copying of file groups and data files in order of the priority indices assigned to respective data tables starting with data files containing data relating to data tables with the highest assigned priority indices. For example, copy manager re-arranges the file groups such that data files containing data relating to data files with higher priority indices are re-assigned to file groups scheduled to be copied earlier to the target memory devices, and data files containing data relating to data files with lower priority indices are assigned to file groups scheduled to be copied later to the target memory devices.

By identifying and copying critical data tables first, the described system and methods may ensure that critical data needed for optimally operating the target computing environment is copied to the target computing environment before the target memory devices run out of memory space. Thus, even when the target memory devices have insufficient memory space to store all data from the source memory devices, a data restoration may not fail and the target computing environment may operate optimally as the critical data tables and associated data files may have already been copied to the target memory devices when the target memory devices run out of memory space during a data copy. Thus, the disclosed system and methods improve the technology related to data restoration between computing environments in a multi-environment system.

The disclosed system and methods provide an additional technical advantage of improving performance of a computing system configured to run computing environments or portions thereof in a multi-environment system. For example, in the event that a target computing environment has insufficient memory space to store all data files from a source computing environment, the disclosed system and methods may help ensure that most critical data is copied to the target computing environment so that a data restoration operation does not fail and the target computing environment operates optimally after each data restore. By avoiding data copy failures and errors in the operation of the target computing environment as a result of critical data files not being copied, the disclosed system and methods improve the efficiency of the target computing environment and the overall efficiently of a multi-environment system. This in turn improves the processing performance of the computing system running the computing environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example calculation of criticality index for data tables based on data lineage information of data tables, in accordance with one or more embodiments of the present disclosure;

FIGS. 3A and 3B illustrates an example calculation of value coefficients for data tables, in accordance with one or more embodiments of the present disclosure;

DETAILED DESCRIPTION

System Overview

Figure 1:
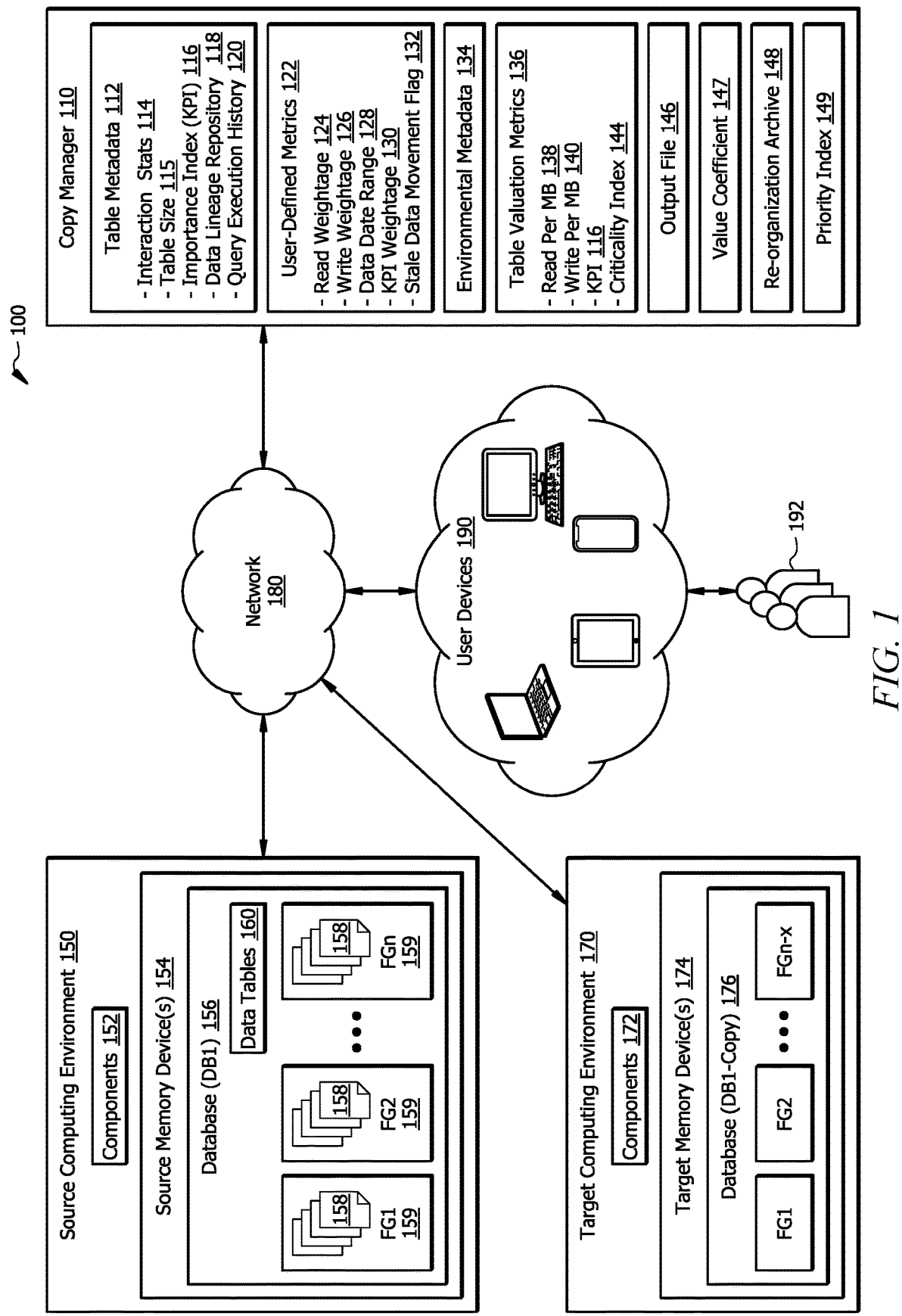
FIG. 1 is a schematic diagram of an example data processing system, in accordance with one or more embodiments of the present disclosure.

FIG. 1 is a schematic diagram of an example data processing system 100, in accordance with one or more embodiments of the present disclosure.

As shown in FIG. 1, data processing system 100 may include source computing environment 150, target computing environment 170, copy manager 110 and user devices 190, each connected to network 180. Network 180, in general, may be a wide area network (WAN), a personal area network (PAN), a cellular network, or any other technology that allows devices to communicate electronically with other devices. In one or more embodiments, network 180 may be the Internet. Each user device 190 may be a computing device that can be operated by a user 192 and communicate with other devices connected to the network 180.

In one or more embodiments, each of the source computing environment 150, target computing environment 170, copy manager 110 and user devices 190 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the source computing environment 150, target computing environment 170, copy manager 110 and user devices 190 may be representative of a server running one or more software applications to implement respective functionality as described below. In certain embodiments, one or more of the source computing environment 150, target computing environment 170, copy manager 110 and user devices 190 may run a thin client software application where the processing is directed by the thin client but largely performed by a central entity such as a server (not shown).

Each of the source computing environment 150 and the target computing environment 170 may represent a computing environment of an organization. For example, the source computing environment 150 may represent a production computing environment where the latest versions of software, products or updates are pushed live to the intended users. A production computing environment generally can be thought of as a real-time computing system where computer programs are run and hardware setups are installed and relied on for an organization's daily operations. In one embodiment, the target computing environment 170 may represent a lower level environment such as a development environment or testing environment. A development environment in software and web development generally refers to a workspace for software developers to make changes to one or more software applications without affecting a live environment such as a production environment. A test environment generally refers to a workspace a series of tests can be conducted on a software application before deployment in a production environment.

As shown, each of the source computing environment 150 and the target computing environment 170 may include a plurality of components 152 and 172 respectively, including one or more hardware devices and one or more software applications. Each component 152 or 172 may include a hardware device or a software application. Hardware devices may include, but are not limited to, one or more processors, one or more memory devices, servers, desktop computer, mobile computing devices, printed circuit boards (e.g., display cards, sound cards, interface cards etc.), electronic components (e.g. transistors, diodes, capacitors, resistors etc.) and machines. Software applications may include software programs including, but not limited to, operating systems, user interface applications, third party software, database management software and other customized software programs implementing particular functionalities in each of the computing environments 150 and 170. In an embodiment, one or more software applications are run using hardware devices to implement one or more functionalities in a computing environment 150 or 170. For example, software code relating to one or more software applications may be stored in a memory device and one or more processors may process the software code to implement respective functionalities in the computing environment 150 and 170.

It may be noted that while FIG. 1 shows the system 100 as including two computing environments, a person having ordinary skill in the art may appreciate that system 100 may include more than two computing environments.

As shown in FIG. 1, source computing environment 150 may have one or more source memory devices 154 that store data for the source computing environment 150. The memory devices 154 may include one or more primary storage devices such as Random-Access Memory (RAM) or one or more secondary storage devices including but not limited to magnetic disks, optical disks, hard disks, flash disks and magnetic tapes. For example, as shown in FIG. 1, source memory device 154 may store a database 156 (shown as DB1). Data relating to the database 156 is physically stored in the source memory devices 154 as a plurality of data files 158 grouped into a plurality of file groups 159 (shown as FG1, FG2 . . . FGN). Data files 158 of the database 156 may include one or more primary data files, one or more secondary data files and one or more log data files. The primary and secondary data files may contain data and objects such as data tables, indexes, stored procedures and views. A log data file may hold transaction log information relating to the database 156. In one embodiment, database 156 includes a primary data file, one or more secondary data files which are typically user-defined data files, and one or more log data files. For example, a simple database may include one primary data file that contains all data and objects and a log data file that contains the transaction log information. A more complex database such as a database storing employee information for a large organization may include one primary data file, several secondary data files and several log files. The data and objects within the database may be spread across the primary data file and the several secondary data files, and all the log files may include the transaction log information for the database. Database 156 may include several file groups 159 (shown as FG1, FG2 . . . FGN). File groups 159 may include a primary file group and one or more user-defined file groups. The primary file group generally includes the primary data file and any secondary data files that are not in other file groups. A file group 159 may include data files 158 stored in separate storage device (e.g., disk drives). For example, data files Data1, Data 2 and Data 3 may be stored on three separate disk drives and assigned to a single file group FG1. One or more data tables 160 may be created based on data stored in one or more data files 158 of one or more file groups 159. For example, a data table 160 may be created that includes data from each of the data files Data1, Data 2 and Data 3 (spread across three separate disk drives) in file group FG1. In this case, queries for data from the data table 160 is spread across the three disks.

As shown in FIG. 1, the target computing environment 170 may have one or more target memory devices 174 that store data for the target computing environment 170. The memory devices 174 may include one or more primary storage devices such as Random-Access Memory (RAM) or one or more secondary storage devices including but not limited to magnetic disks, optical disks, hard disks, flash disks and magnetic tapes.

In some cases, the target computing environment 170 undergoes periodic restoration which includes copying data stored in the source memory devices 154 to the target memory devices 174. Each restoration event essentially creates an image of the source computing environment 150 in the target computing environment 170. For example, the source computing environment 150 may be a production environment of an organization and the target computing environment may be a lower level environment such as a development environment or test environment. Software developers may create and test software patches or updates for one or more software applications in the image of the production environment stored in the lower level environment so that there is no service interruption in the production environment. Once ready, the software patch or update may be applied to the respective software application in the live production environment. However, in some cases, the target computing environment 170 may have insufficient storage capacity within the target memory devices 174 to accommodate the entire data stored in the source memory devices 154 during a data copy. A common error associated with copying data between computing environments (e.g., source computing environment 150 to target computing environment 170) in a multi-environment system (such as system 100) is a restoration failure or abort as a result of the target environment having insufficient memory space for copying all data from the source environment. In most such failure events, even if the target memory devices have sufficient memory space to accommodate all critical data files (e.g., critical data tables) needed for operating the target environment, a data restoration may still fail as presently no mechanism exists to select and copy the critical data files first so that only non-critical data files and tables are left uncopied when the target memory devices run out of memory space.

Embodiments of the present disclosure describe techniques for automatically and intelligently prioritizing data tables 160 and file groups 159 at a source computing environment 150 based on pre-defined metrics so that data files 158 associated with critical data tables 160 are prioritized during a data copy to a target computing environment 170. By identifying and copying critical data tables 160 first, the described system and methods may ensure that critical data needed for optimally operating the target computing environment 170 is copied to the target computing environment 170 before the target memory devices 174 run out of memory space. Thus, even when the target memory devices 174 have insufficient memory space to store all data from the source memory devices 154, a data restoration may not fail and the target computing environment 170 may operate optimally or near optimally as the critical data tables 160 and associated data files 158 may have been copied to the target memory devices 174. It may be noted that the terms "data restore or restoration" and "data copy" are used interchangeably throughout this disclosure.

Copy manager 110 may be configured to manage a data copy or data restoration from the source computing environment 150 to the target computing environment 170. Copy manager 110 may receive a request for a data restore or data copy from the source computing environment 150 to the target computing environment 170. The request for the data copy may be generated by a user 192 using a user device 190. The user 192 generating the request may be an administrator of the source computing environment 150 and/or the target computing environment 170 or any other user 192 with appropriate credentials to make such a request. In response to receiving the request for data copy, copy manager 110 may determine whether the target memory devices 174 have sufficient memory space to receive and store the entire database 156 (or otherwise all data) stored in the source memory devices 154. Copy manager 110 may have access to environment metadata 134 including metadata relating to the source computing environment 150 and the target computing environment 170. The environment metadata 134 may include information relating to a size of each of the source memory devices 154, a size of each of the target memory devices 174, a size of each data table 160 of the database 156, and memory space needed in each of the target memory devices 174 for operational purposes. Copy manager 110 may be configured to calculate a total amount of data to be copied from the source memory devices 154 to the target memory devices 174 based on the individual data table sizes of the data tables 160. For example, copy manager 110 may add the sizes of all data tables 160 (e.g., obtained from the environment metadata 134) to determine the total data size to be copied to the target memory devices 174. Copy manager 110 may be configured to determine a combined memory space available at the target memory devices 174 (e.g., when the target memory devices include multiple storage disks) to store data received from the source memory devices 154. For example, copy manager 110 may calculate the available memory at the target memory devices 174 by subtracting the total memory space needed at the target memory devices 174 for operational purposes from the total combined memory space of target memory devices 174. Copy manager 110 may be configured to compare the total data size to be copied from the source memory devices 154 with the total memory space available at the target memory devices 174 to store the data. When the memory space available at the target memory devices 174 is less than the total data size to be copied from the source memory devices 154, copy manager may be configured to determine that the target memory devices 174 have insufficient memory space to receive and store the entire database 156 (or otherwise all data) stored in the source memory devices 154.

In response to determining that target memory devices 174 have insufficient memory space to store the entire database 156 (or otherwise all data) stored in the source memory devices 154, copy manager 110 may be configured to assign priorities (e.g., priority index 149 as shown in FIG. 1) to data tables 160 based on pre-defined metrics, and copy data files 158 and file groups 159 relating to the data tables 160 in the order of respective priorities assigned to the data tables 160 starting with data files 158 having data for data tables 160 with the highest assigned priorities. As further described below, copy manager 110 may assign priorities to each data table 160 of the database 156 based on a relative importance of the data table 160 (as determined based on the pre-defined metrics) among a plurality of data tables 160 defined for the database 156. This technique may ensure that data relating to the most critical data tables 160 is copied prior to data relating relatively non-critical data tables 160. As further described below, one or more of the pre-defined metrics may be indicative of or can be used to determine the importance of each data table 160 in the context of the target computing environment 170. Each pre-defined metric associated with a data table 160 may have a default value based on the nature of data contained in the data table 160 or a user-defined value to suit particular needs of the target computing environment 170.

Copy manager 110 may have access to a plurality of pre-defined metrics relating to each data table 160. As shown in FIG. 1, the pre-defined metrics may include, but are not limited to, table metadata 112, user-defined metrics 122 and environment metadata 134. Table metadata 112 may include, but is limited to, table interaction statistics 114, table size 115, importance index 116, data lineage repository 118 and query execution history 120. Table interaction statistics 114 relating to a data table 160 may include information regarding an amount of one or more types of interactions performed in relation to the data table 160. For example, table interaction statistics 114 may include a total number of read operations performed in the data table 160 and a total number of write operations performed in the data table 160. Table size 115 may include a size of a data table 160 indicative of a total memory space occupied by the data table 160 in the source memory devices 154. Importance index 116 relating to a data table 160 may be indicative of an importance of the data table 160 in the source computing environment 150. Importance index 116 may include a Key Performance Indicator (KPI) index typically assigned to the data table 160 based on how important the data table is for the source computing environment 150 and/or the target computing environment 170. The terms "importance index" and "KPI" are used interchangeably throughout this disclosure. Data lineage repository 118 may include information relating to how each data table 160 of the database 156 is related to other data tables 160 of the database 156. For example, data lineage information relating to a first data table may indicate that a second data table depends upon the first data table to calculate values relating to at least one data field/data type in the second data table. As described below, data lineage information relating to a data table 160 from the data lineage repository 118 may be used to determine how critical the data table may be for one or more applications in the target computing environment 170. Query execution history 120 relating to a data table 160 may include information relating to queries processing in the data table 160. Copy manager 110 may be configured to derive relations between data tables 160 based on query execution histories 120 relating to the data tables 160. For example, query execution history 120 may indicate that data from several data tables 160 was accessed to process a query, indicating that those data tables 160 are related. In one embodiment, copy manager 110 may be configured to derive relations between data tables 160 based on query execution histories 120 when data lineage repository 118 is unavailable or otherwise does not include data lineage information relating to one or more data tables 160. In addition, table metadata 112 may also include data logs relating to data tables 160 which can also be used to derive data lineage information relating to data tables 160.

User-defined metrics may include, but are not limited to, read weightage 124, write weightage 126, data date range 128, KPI weightage 130 and stale data movement flag 132. Read weightage 124 assigned to a data table 160 may include a numerical weight assigned to read operations performed in the data table 160. Write weightage 126 assigned to a data table 160 may include a numerical weight assigned to write operations performed in the data table 160. KPI weightage 130 assigned to a data table 160 may include a numerical weight assigned to the importance index 116 (e.g., KPI) of the data table 160. As further described below, each of the read weightage 124, write weightage 126 and KPI weightage 130 decides how much influence the respective metric (e.g., read operations, write operations and KPI respectively) has in deciding the value of a data table 160 in the target computing environment 170. For example, a user 192 of the target computing environment 170 may assign a higher read weightage 124 to read intensive data tables 160 and may assign a higher write weightage 126 to write intensive data tables 160. A user may assign the KPI weightage 130 to adjust the default KPI index assigned to a data table 160. Data date range 128 defined for a data table 160 may include a date range (and/or time range), wherein data from the data table 160 associated with the data range (and/or time range) is to be copied to the target memory devices 174. For example, a data date range 128 defined for a data table 160 containing employee records for an organization, may specify that employee records relating to employee joining dates within the past three months are to be copied to the target memory devices 174. Defining a data date range 128 may be useful especially for large data tables 160 when the target computing environment does not need all data from the data tables 160. For example, when the target computing environment 170 is a lower level environment such as a test environment, all data from a large data table may not be needed to test certain features. In this case, a user 192 of the target computing environment 170 may define a data date range for the data table 160 so that data relating to the data date range can be copied instead of copying the entire data table 160. Stale data movement flag 132 relating to a data table 160 may specify whether data from a data table 160 that has remained unchanged since a previous data copy to the target memory devices 174 is to be copied again in a subsequent data copy to the target memory devices 174. As described above, the target computing environment 170 may undergo periodic data restorations from the source computing environment 150. Typically, a portion of the data stored in the database 156 may have remained unchanged between two data copies. Generally, there is no need to re-copy data from a data table 160 that has remained unchanged since a previous data copy. However, in some cases, the user 192 of the target computing environment 170 may want unchanged data from the data table 160 to be copied again in a subsequent data copy, for example, to record unchanged status of the data over several data copies. In such a case, a user 192 may set the stale data movement flag 132 for the data table 160 to indicate that data from the data table 160 that has remined unchanged since a previous data copy is to be copied again to the target memory devices 174 in a subsequent data copy.

In one embodiment, when one or more of the user-defined metrics 122 are not defined for a data table 160, pre-selected default values are set for the respective user defined metrics 122. For example, when a read weightage 124, write weightage 126 or KPI weightage 130 is not defined by a user 192 for a particular data table 160, default weightages are assigned to these metrics.

Environment metadata 134 may include, but is not limited to, metadata relating to the source computing environment 150 as well as the target computing environment 170. Metadata relating to the source computing environment 150 may include a size of each data table 160. Metadata relating to the target computing environment 170 may include a number of target memory devices 174, size of each target memory device 174, memory space available in the target memory devices 174 to store data and amount of space needed in each target memory device 174 for operational purposes. Copy manager 110 may be configured to determine based on the environment metadata 134 that the target memory devices 174 have insufficient memory space to receive and store the entire database 156 (or otherwise all data) stored in the source memory devices 154.

Copy manager 110 may be configured to determine a plurality of table valuation metrics 136 for each data table 160 based on one or more of the table metadata 112 and the user-defined metrics 122. For example, copy manager 110 may be configured to calculate a criticality index 144 for each data table 160 based on data lineage information relating to the data table 160. The criticality index 144 of a data table 160 is indicative of how critical the data table 160 is to one or more software applications in the target computing environment 170, based on whether and how many other data tables 160 depend on the data table 160. Copy manager 110 may obtain data lineage information relating to each data table 160 from data lineage repository 118 or may determine the data lineage information from query execution history 120 of the data table 160. For example, for each data table 160, copy manager 110 may be configured to determine whether one or more other data tables 160 depend on the data in the data table 160 for calculating a value of at least one data field. Copy manager 110 may be configured to calculate the criticality index 144 of the data table 160 based on a KPI index 116 of the data table 160 and the criticality index 144 of the one or more other data tables 160 that depend on the data table 160, wherein the criticality index 144 of a data table 160 is higher when one or more other data tables 160 depend on the data table 160 as compared to the criticality index of the data table 160 when no other data tables depend on the data table 160.

FIG. 2 illustrates an example calculation of criticality index 144 for data tables 160 based on data lineage information of data tables 160, in accordance with one or more embodiments of the present disclosure. FIG. 2 shows four data tables named Table 1, Table 2, Table 3 and Table 4. Table 1 includes three columns/fields named as ColA, ColB and ColC. Table 2 includes four columns/fields named as ColW, ColX, ColY and ColZ. Table 3 includes two columns/fields named as ColG and ColH. Table 4 includes two columns/fields named as ColS and ColT. As shown, ColZ of Table 2 is calculated as an addition of ColA and ColC of Table 1. This may mean that a value of any data field in ColZ of Table 2 is calculated as a summation of values in respective data fields in ColA and ColC of Table 1. Similarly, ColH of Table 3 is calculated as a sum of ColZ and ColX. The pre-assigned KPIs (e.g., same as importance index 116) of Tables 1, 2, 3 and 4 are 3, 4, 3 and 4 respectively. As shown, KPI per column (shown as KPI/Column) for each data table may be calculated as the KPI of the data table divided by the number of columns in the table. The criticality index for each of the data tables may be calculated as:

((KPI/column)*number of columns)+Criticality Index of each dependent data table

For example, the criticality index of Table 3 may be calculated as (((3/2)*2)/10)=0.3. As no other data table depends on Table 3, the criticality index of Table 3 is based only on its own KPI. Criticality index of Table 2 may be calculated as (((4/4)*4)/10)+(Criticality Index of Table 3)=0.7. The criticality index of Table 3 is added here as Table 3 depends on Table 2. Similarly, criticality index of Table 1 may be calculated as ((3/3)*3)/10+(Criticality Index of Table 2)=1, as Table 2 depends on Table 1.

Copy manager 110 may be configured to calculate Read per MB 138 for each data table 160 as No. of Read Operations performed in the data table divided by the table size 115 of the data table 160. Copy manager 110 may be configured to calculate Writes per MB 140 for each data table 160 as No. of Write Operations performed in the data table divided by the table size 115 of the data table 160. Copy manager 110 may be configured to obtain the No. of Read Operations and No. of Write Operations performed in the data table 160 from the interaction statistics 114 of the data table 160. As shown in FIG. 1, table valuation metrics 136 for each data table 160 may also include the KPI 116 of the data table 160. As further described below, criticality index 144 of a data table 160 may be used in calculating a value coefficient 147 of the data table 160 and to eventually assign a priority index 149 to the data table 160, wherein a higher criticality index 144 results in a higher value coefficient 147 and eventually a higher priority index 149 for the data table 160. A higher value coefficient 147 and priority index 149 of a data table 160 increases the likelihood that the data files 158 and file groups 159 containing data relating to the data table 160 are copied to the target memory devices 174. Thus, the criticality index 144 helps preserve data lineage in the target computing environment 170 by influencing prioritization of data tables 160 upon which one or more other data tables 160 depend from.

Copy manager 110 may be configured to calculate a value coefficient 147 based on one or more of the table valuation metrics 136.

FIGS. 3A and 3B illustrates an example calculation of value coefficients 147 for data tables 160, in accordance with one or more embodiments of the present disclosure.

FIG. 3A shows five data tables 160 named as Table A, B, C D and E. FIG. 3A also shows the table valuation metrics 136 for each data table 160 including read per MB 138, write per MB 140, KPI index 116 and the calculated criticality index 144 for the data table 160. FIG. 3B shows user-defined metrics 122 that applies to all the five tables A-E. As shown, Read weightage 124 is 0.4, Write weightage 126 is 0.5 and KPI weightage 130 is 0.1. Further, as shown, the stale data movement flag 132 is set to "Y", meaning that unchanged data from a previous data copy is to be copied again. It may be noted that while FIG. 3B shows common user-defined metrics 122 assigned to all data tables, it may be appreciated that one or more of the data tables may have custom user-defined metrics 122 that are different from the user-defined metrics 122 of one or more other data tables.

A value coefficient 147 may be calculated for each of the data tables 160 as, Value Coefficient=[(Read Per MB*Read Weightage)+ (Write Per MB*Write Weightage)+(KPI Index*KPI Weightage)]/Criticality Index FIG. 3A shows the calculated value coefficients 147 for each of the Tables A-E based on the above equation. As shown value coefficients 147 for Tables A-E are 0.561350361, 0.544275347, 0.440070869, 0.643952764 and 0.48 respectively.

Once the value coefficients 147 have been calculated for the data tables 160, copy manager 110 may be configured to assign a priority index 149 to each data table 160 based on the value coefficient 147 of the data table 160, wherein a higher priority index 149 is assigned to a data table 160 having a higher value coefficient 147. As shown in FIG. 3A, priority indices of 1-5 have been assigned to the data tables A-E, with the highest priority index of "1" assigned to Table D having the highest value coefficient 147 and the lowest priority index of "5" assigned to Table C having the lowest value coefficient 147.

Once a value coefficient 147 and priority index 149 has been determined for each data table 160, copy manager 110 may be configured to schedule copying of the file groups 159 and data files 158 in order of the priority indices 149 assigned to respective data tables 160 starting with data files 158 containing data relating to data tables 160 with the highest assigned priority indices 149. In one embodiment, copy manager 110 may be configured to re-arrange the file groups 159 such that data files 158 containing data relating to data tables 160 with higher priority indices 149 are assigned to file groups 159 scheduled to be copied earlier to the target memory devices 174, and data files 158 containing data relating to data tables 160 with lower priority indices 149 are assigned to file groups 159 scheduled to be copied later to the target memory devices 174. For example, file groups FG1-FGn may be placed in a copy queue in numerical order with FG1 scheduled to be copied first and the FGn scheduled to be copied last. Copy manager 110 may be configured to assign data files 158 to the file groups FG1-FGn based on the priority indices 149 of data tables 160 for which the data files 158 hold data, wherein data files 158 containing data relating to data tables 160 having the highest priority indices 149 are assigned to FG1 and data files 158 containing data relating to data tables 160 having the lowest priority indices 149 are assigned to FGn. Re-arranging the file groups in the copy queue based on the priority indices 149 of the data tables 160 may ensure that the most critical data tables are copied first to the target memory devices 174. Thus, for example, even when all file groups FG1-FGn cannot be copied to the target memory devices 174 as a result of insufficient storage space in the target memory devices 174, there is a high likelihood that most or all critical data files 158 and corresponding data tables 160 are copied to before the target memory devices 174 runs out of memory. As shown in FIG. 1, target memory devices 174 have received and stored a copy of the database 156 (shown as DB1_copy) with file groups FG1-FGn-x having been copied when the target memory devices 174 run out of memory. In this case, n-x refer to the number of file groups 159 and/or data files 158 that were not copied as a result of insufficient memory space in the target memory devices 174.

In one or more embodiments, when a data date range 128 has been defined for a data table 160, data files 158 that contain data relating to the defined data date range 128 for the data table 160 are prioritized over data files 158 that contain data that is outside the defined data date range 128 for the data table 160. For example, only data files 158 that contain data relating to the defined data date range 128 for the data table 160 are assigned to the file groups 159 based on the priority index 149 of the data table 160, so that data from the data table 160 that is outside the defined data date range 128 is not copied to the target memory devices 174. In additional or alternative embodiments, when the stale data movement flag 132 for a data table 160 is set to indicate that unchanged data from a the data table 160 from a previous copy is not to be copied again, copy manager 110 may be configured to skip assigning data files 158 to file groups 159 that contain unchanged data from the data table 160, so that unchanged data is not copied again to the target memory devices 174. These measures may further help ensure that most critical data files 158 are copied to the target memory devices 174.

In one or more alternative or additional embodiments, copy manager 110 may use information relating to a previous data restoration or data copy to re-arrange the file groups 159. For example, copy manager 110 may have access to re-organization archive 148 that includes information relating to re-organization of file groups 159 from a previous data copy between the source computing environment 150 and the target computing environment 170. For example, re-organization archive 148 may include information such as data table name/data file name, database name, original file group from which the data file/data table was moved, target file group to which the data file/data table was moved for the data copy, target drive/disk to which the file group was moved etc. Copy manager 110 may be configured to re-arrange the file groups 159 at least partially based on information from the re-organization archive 148 relating to how one or more data files/data tables were re-assigned during a previous data copy. For example, copy manager 110 may be configured to assign a data file 158 to a file group 159 based on information relating to how the data file 158 was re-assigned in a previous data copy. In one embodiment, copy manager 110 may assign a data file/data table to the same file group 159 it was assigned in a previous data copy.

In one or more alternative or additional embodiments, copy manager 110 may be configured to generate an output file 146 that includes information relating to how the file groups 159 are to be re-arranged for a data copy between the source computing environment 150 and the target computing environment 170. The output file 146 may include for each data file/data table, table name/data file name, table size, source drive in the source computing environment 150, target drive in the target computing environment 170, source file group 159 the data file/data table was assigned and a target file group 159 the data file/data table is to be assigned to for the data copy. The data copy may be performed (e.g., automatically by the copy manager 110 or manually by a user 192) based on the information in the output file 146.

Figure 4:
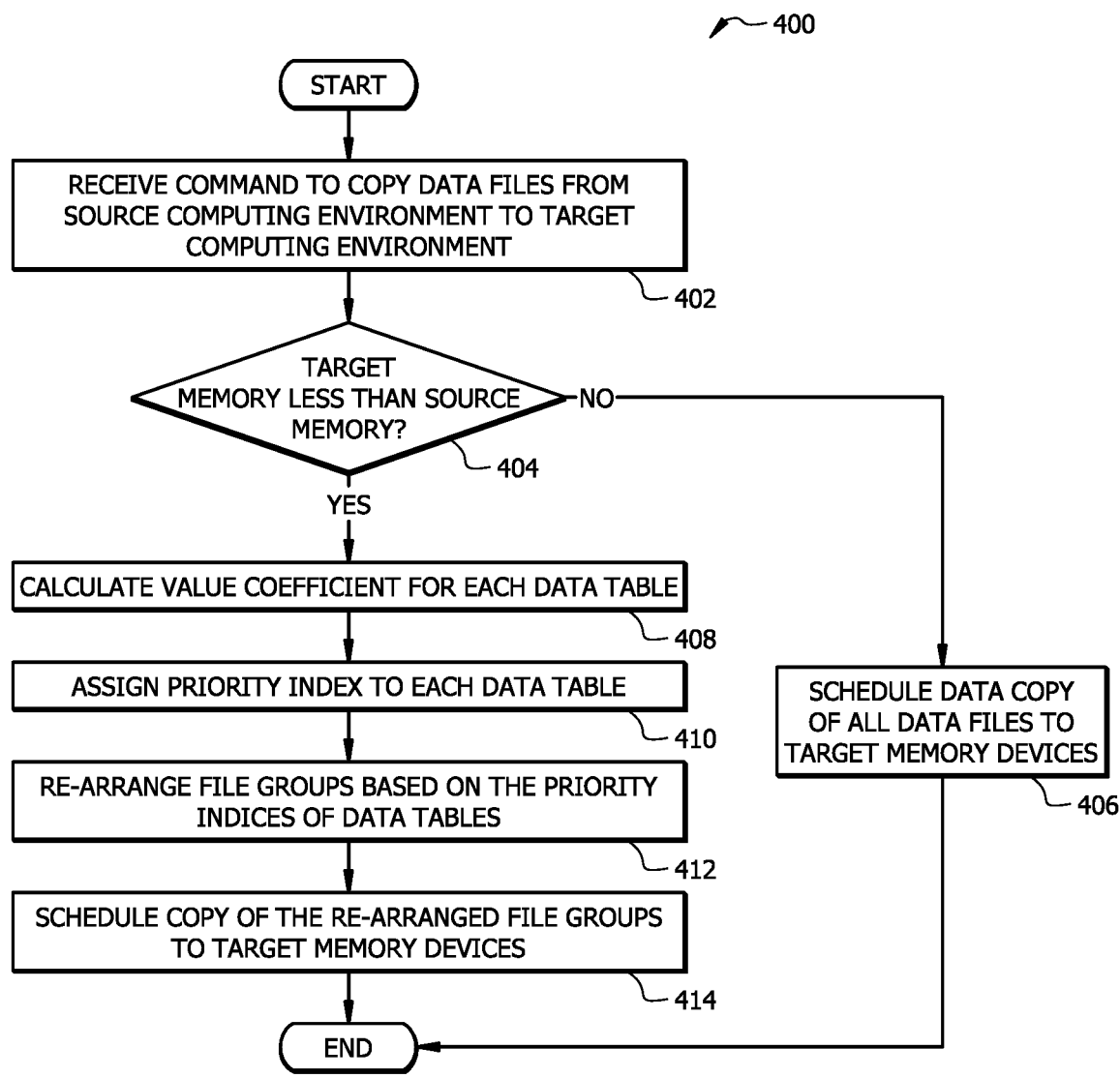
FIG. 4 is a flowchart of an example method for managing a data copy from a source computing environment to a target computing environment, in accordance with one or more embodiments of the present disclosure.

FIG. 4 is a flowchart of an example method 400 for managing a data copy from a source computing environment 150 to a target computing environment 170, in accordance with one or more embodiments of the present disclosure. Method 400 may be performed by the copy manager 110 as shown in FIG. 1 and described above.

At operation 402, copy manager 110 receives a command or request to copy a plurality of data files from one or more source memory devices 154 to one or more target memory devices 174.

As described above, the target computing environment 170 may undergo periodic restoration which includes copying data stored in the source memory devices 154 to the target memory devices 174. Each restoration event essentially creates an image of the source computing environment 150 in the target computing environment 170. For example, the source computing environment 150 may be a production environment of an organization and the target computing environment may be a lower level environment such as a development environment or test environment. However, in some cases, the target computing environment 170 may have insufficient storage capacity within the target memory devices 174 to accommodate the entire data stored in the source memory devices 154 during a data copy. Copy manager 110 may be configured to manage a data copy or data restoration from the source computing environment 150 to the target computing environment 170. Copy manager 110 may receive a request for a data restore or data copy from the source computing environment 150 to the target computing environment 170. The request for the data copy may be generated by a user 192 using a user device 190. The user 192 generating the request may be an administrator of the source computing environment 150 and/or the target computing environment 170 or any other user 192 with appropriate credentials to make such a request.

At operation 404, in response to receiving the request for data copy, copy manager 110 may determine whether the target memory devices 174 have sufficient memory space to receive and store the entire database 156 (or otherwise all data) stored in the source memory devices 154. Copy manager 110 may have access to environment metadata 134 including metadata relating to the source computing environment 150 and the target computing environment 170. The environment metadata 134 may include information relating to a size of each of the source memory devices 154, a size of each of the target memory devices 174, a size of each data table 160 of the database 156, and memory space needed in each of the target memory devices 174 for operational purposes. Copy manager 110 may be configured to calculate a total amount of data to be copied from the source memory devices 154 to the target memory devices 174 based on the individual data table sizes of the data tables 160. For example, copy manager 110 may add the sizes of all data tables 160 (e.g., obtained from the environment metadata 134) to determine the total data size to be copied to the target memory devices 174. Copy manager 110 may be configured to determine a combined memory space available at the target memory devices 174 (e.g., when the target memory devices include multiple storage disks) to store data received from the source memory devices 154. For example, copy manager 110 may calculate the available memory at the target memory devices 174 by subtracting the total memory space needed at the target memory devices 174 for operational purposes from the total combined memory space of target memory devices 174. Copy manager 110 may be configured to compare the total data size to be copied from the source memory devices 154 with the total memory space available at the target memory devices 174 to store the data. When the memory space available at the target memory devices 174 is less than the total data size to be copied from the source memory devices 154, copy manager may be configured to determine that the target memory devices 174 have insufficient memory space to receive and store the entire database 156 (or otherwise all data) stored in the source memory devices 154.

When copy manager 110 determines that the target memory devices 174 have sufficient memory space to receive and store the entire database 156 (or otherwise all data) stored in the source memory devices 154, method 400 proceeds to operation 406 where copy manager 110 copies all data files 158 and file groups 159 from the source memory devices 154 to the target memory devices 174. However, when copy manager 110 determines that the target memory devices 174 have insufficient memory space to receive and store the entire database 156 (e.g. the plurality of data files 158 and file groups 159) stored in the source memory devices 154, method 400 proceeds to operation 408, At operation 408, copy manager 110 calculates a value coefficient for each data table 160 of the database 156.

In response to determining that target memory devices 174 have insufficient memory space to store the entire database 156 (or otherwise all data) stored in the source memory devices 154, copy manager 110 may be configured to assign priorities (e.g., priority index 149 as shown in FIG. 1) to data tables 160 based on pre-defined metrics, and copy data files 158 and file groups 159 relating to the data tables 160 in the order of respective priorities assigned to the data tables 160 starting with data files 158 having data for data tables 160 with the highest assigned priorities. Copy manager 110 may assign priorities to each data table 160 of the database 156 based on a relative importance of the data table 160 (as determined based on the pre-defined metrics) among a plurality of data tables 160 defined for the database 156. This technique may ensure that data relating to the most critical data tables 160 is copied prior to data relating relatively non-critical data tables 160. As further described below, one or more of the pre-defined metrics may be indicative of or can be used to determine the importance of each data table 160 in the context of the target computing environment 170. Each pre-defined metric associated with a data table 160 may have a default value based on the nature of data contained in the data table 160 or a user-defined value to suit particular needs of the target computing environment 170.

Copy manager 110 may have access to a plurality of pre-defined metrics relating to each data table 160. As shown in FIG. 1, the pre-defined metrics may include, but are not limited to, table metadata 112, user-defined metrics 122 and environment metadata 134. Table metadata 112 may include, but is limited to, table interaction statistics 114, table size 115, importance index 116, data lineage repository 118 and query execution history 120. Table interaction statistics 114 relating to a data table 160 may include information regarding an amount of one or more types of interactions performed in relation to the data table 160. For example, table interaction statistics 114 may include a total number of read operations performed in the data table 160 and a total number of write operations performed in the data table 160. Table size 115 may include a size of a data table 160 indicative of a total memory space occupied by the data table 160 in the source memory devices 154. Importance index 116 relating to a data table 160 may be indicative of an importance of the data table 160 in the source computing environment 150. Importance index 116 may include a Key Performance Indicator (KPI) index typically assigned to the data table 160 based on how important the data table is for the source computing environment 150 and/or the target computing environment 170. The terms "importance index" and "KPI" are used interchangeably throughout this disclosure. Data lineage repository 118 may include information relating to how each data table 160 of the database 156 is related to other data tables 160 of the database 156. For example, data lineage information relating to a first data table may indicate that a second data table depends upon the first data table to calculate values relating to at least one data field/data type in the second data table. As described below, data lineage information relating to a data table 160 from the data lineage repository 118 may be used to determine how critical the data table may be for one or more applications in the target computing environment 170. Query execution history 120 relating to a data table 160 may include information relating to queries processing in the data table 160. Copy manager 110 may be configured to derive relations between data tables 160 based on query execution histories 120 relating to the data tables 160. For example, query execution history 120 may indicate that data from several data tables 160 was accessed to process a query, indicating that those data tables 160 are related. In one embodiment, copy manager 110 may be configured to derive relations between data tables 160 based on query execution histories 120 when data lineage repository 118 is unavailable or otherwise does not include data lineage information relating to one or more data tables 160. In addition, table metadata 112 may also include data logs relating to data tables 160 which can also be used to derive data lineage information relating to data tables 160.

User-defined metrics may include, but are not limited to, read weightage 124, write weightage 126, data date range 128, KPI weightage 130 and stale data movement flag 132. Read weightage 124 assigned to a data table 160 may include a numerical weight assigned to read operations performed in the data table 160. Write weightage 126 assigned to a data table 160 may include a numerical weight assigned to write operations performed in the data table 160. KPI weightage 130 assigned to a data table 160 may include a numerical weight assigned to the importance index 116 (e.g., KPI) of the data table 160. As further described below, each of the read weightage 124, write weightage 126 and KPI weightage 130 decides how much influence the respective metric (e.g., read operations, write operations and KPI respectively) has in deciding the value of a data table 160 in the target computing environment 170. For example, a user 192 of the target computing environment 170 may assign a higher read weightage 124 to read intensive data tables 160 and may assign a higher write weightage 126 to write intensive data tables 160. A user may assign the KPI weightage 130 to adjust the default KPI index assigned to a data table 160. Data date range 128 defined for a data table 160 may include a date range (and/or time range), wherein data from the data table 160 associated with the data range (and/or time range) is to be copied to the target memory devices 174. For example, a data date range 128 defined for a data table 160 containing employee records for an organization, may specify that employee records relating to employee joining dates within the past three months are to be copied to the target memory devices 174. Defining a data date range 128 may be useful especially for large data tables 160 when the target computing environment does not need all data from the data tables 160. For example, when the target computing environment 170 is a lower level environment such as a test environment, all data from a large data table may not be needed to test certain features. In this case, a user 192 of the target computing environment 170 may define a data date range for the data table 160 so that data relating to the data date range can be copied instead of copying the entire data table 160. Stale data movement flag 132 relating to a data table 160 may specify whether data from a data table 160 that has remained unchanged since a previous data copy to the target memory devices 174 is to be copied again in a subsequent data copy to the target memory devices 174. As described above, the target computing environment 170 may undergo periodic data restorations from the source computing environment 150. Typically, a portion of the data stored in the database 156 may have remained unchanged between two data copies. Generally, there is no need to re-copy data from a data table 160 that has remained unchanged since a previous data copy. However, in some cases, the user 192 of the target computing environment 170 may want unchanged data from the data table 160 to be copied again in a subsequent data copy, for example, to record unchanged status of the data over several data copies. In such a case, a user 192 may set the stale data movement flag 132 for the data table 160 to indicate that data from the data table 160 that has remined unchanged since a previous data copy is to be copied again to the target memory devices 174 in a subsequent data copy.

In one embodiment, when one or more of the user-defined metrics 122 are not defined for a data table 160, pre-selected default values are set for the respective user defined metrics 122. For example, when a read weightage 124, write weightage 126 or KPI weightage 130 is not defined by a user 192 for a particular data table 160, default weightages are assigned to these metrics.

Environment metadata 134 may include, but is not limited to, metadata relating to the source computing environment 150 as well as the target computing environment 170. Metadata relating to the source computing environment 150 may include a size of each data table 160. Metadata relating to the target computing environment 170 may include a number of target memory devices 174, size of each target memory device 174, memory space available in the target memory devices 174 to store data and amount of space needed in each target memory device 174 for operational purposes. Copy manager 110 may be configured to determine based on the environment metadata 134 that the target memory devices 174 have insufficient memory space to receive and store the entire database 156 (or otherwise all data) stored in the source memory devices 154.

Copy manager 110 may be configured to determine a plurality of table valuation metrics 136 for each data table 160 based on one or more of the table metadata 112 and the user-defined metrics 122. For example, copy manager 110 may be configured to calculate a criticality index 144 for each data table 160 based on data lineage information relating to the data table 160. The criticality index 144 of a data table 160 is indicative of how critical the data table 160 is to one or more software applications in the target computing environment 170, based on whether and how many other data tables 160 depend on the data table 160. Copy manager 110 may obtain data lineage information relating to each data table 160 from data lineage repository 118 or may determine the data lineage information from query execution history 120 of the data table 160. For example, for each data table 160, copy manager 110 may be configured to determine whether one or more other data tables 160 depend on the data in the data table 160 for calculating a value of at least one data field. Copy manager 110 may be configured to calculate the criticality index 144 of the data table 160 based on a KPI index 116 of the data table 160 and the criticality index 144 of the one or more other data tables 160 that depend on the data table 160, wherein the criticality index 144 of a data table 160 is higher when one or more other data tables 160 depend on the data table 160 as compared to the criticality index of the data table 160 when no other data tables depend on the data table 160. FIG. 2 illustrates an example calculation of criticality index 144 for data tables 160 based on data lineage information of data tables 160 as described above.

Copy manager 110 may be configured to calculate Read per MB 138 for each data table 160 as No. of Read Operations performed in the data table divided by the table size 115 of the data table 160. Copy manager 110 may be configured to calculate Writes per MB 140 for each data table 160 as No. of Write Operations performed in the data table divided by the table size 115 of the data table 160. Copy manager 110 may be configured to obtain the No. of Read Operations and No. of Write Operations performed in the data table 160 from the interaction statistics 114 of the data table 160. As shown in FIG. 1, table valuation metrics 136 for each data table 160 may also include the KPI 116 of the data table 160. As further described below, criticality index 144 of a data table 160 may be used in calculating a value coefficient 147 of the data table 160 and to eventually assign a priority index 149 to the data table 160, wherein a higher criticality index 144 results in a higher value coefficient 147 and eventually a higher priority index 149 for the data table 160. A higher value coefficient 147 and priority index 149 of a data table 160 increases the likelihood that the data files 158 and file groups 159 containing data relating to the data table 160 are copied to the target memory devices 174. Thus, the criticality index 144 helps preserve data lineage in the target computing environment 170 by influencing prioritization of data tables 160 upon which one or more other data tables 160 depend from.

Copy manager 110 may be configured to calculate a value coefficient 147 based on one or more of the table valuation metrics 136. FIG. 3A illustrates an example calculation of value coefficients 147 for data tables 160 as described above.

At operation 410, copy manager 110 assigns a priority index 149 to each data table 160 based on the calculated value coefficient 147 of the data table 160, wherein a higher priority index 149 is assigned to a data table 160 having a higher value coefficient 147.

As described above, once the value coefficients 147 have been calculated for each of the data tables 160, copy manager 110 may be configured to assign a priority index 149 to each data table 160 based on the value coefficient 147 of the data table 160, wherein a higher priority index 149 is assigned to a data table 160 having a higher value coefficient 147. As shown in FIG. 3A, priority indices of 1-5 have been assigned to the data tables A-E, with the highest priority index of "1" assigned to Table D having the highest value coefficient 147 and the lowest priority index of "5" assigned to Table C having the lowest value coefficient 147.

At operation 412, copy manager 110 re-arranges the file groups 159 by assigning the data files 158 to the file groups 159 based on the priority index 149 of the data tables 160 associated with the data files 158, wherein a data file 158 that includes data associated with a data table 160 with a higher priority index 149 is assigned to one or more file groups 159 that are earlier in a copy queue for copying to the target memory devices 174.

As described above, once a value coefficient 147 and priority index 149 has been determined for each data table 160, copy manager 110 may be configured to schedule copying of the file groups 159 and data files 158 in order of the priority indices 149 assigned to respective data tables 160 starting with data files 158 containing data relating to data tables 160 with the highest assigned priority indices 149. In one embodiment, copy manager 110 may be configured to re-arrange the file groups 159 such that data files 158 containing data relating to data tables 160 with higher priority indices 149 are assigned to file groups 159 scheduled to be copied earlier to the target memory devices 174, and data files 158 containing data relating to data tables 160 with lower priority indices 149 are assigned to file groups 159 scheduled to be copied later to the target memory devices 174. For example, file groups FG1-FGn may be placed in a copy queue in numerical order with FG1 scheduled to be copied first and the FGn scheduled to be copied last. Copy manager 110 may be configured to assign data files 158 to the file groups FG1-FGn based on the priority indices 149 of data tables 160 for which the data files 158 hold data, wherein data files 158 containing data relating to data tables 160 having the highest priority indices 149 are assigned to FG1 and data files 158 containing data relating to data tables 160 having the lowest priority indices 149 are assigned to FGn. Re-arranging the file groups in the copy queue based on the priority indices 149 of the data tables 160 may ensure that the most critical data tables are copied first to the target memory devices 174. Thus, for example, even when all file groups FG1-FGn cannot be copied to the target memory devices 174 as a result of insufficient storage space in the target memory devices 174, there is a high likelihood that most or all critical data files 158 and corresponding data tables 160 are copied to before the target memory devices 174 runs out of memory. As shown in FIG. 1, target memory devices 174 have received and stored a copy of the database 156 (shown as DB1_copy) with file groups FG1-FGn-x having been copied when the target memory devices 174 run out of memory. In this case, n-x refer to the number of file groups 159 and/or data files 158 that were not copied as a result of insufficient memory space in the target memory devices 174.

In one or more embodiments, when a data date range 128 has been defined for a data table 160, data files 158 that contain data relating to the defined data date range 128 for the data table 160 are prioritized over data files 158 that contain data that is outside the defined data date range 128 for the data table 160. For example, only data files 158 that contain data relating to the defined data date range 128 for the data table 160 are assigned to the file groups 159 based on the priority index 149 of the data table 160, so that data from the data table 160 that is outside the defined data date range 128 is not copied to the target memory devices 174. In additional or alternative embodiments, when the stale data movement flag 132 for a data table 160 is set to indicate that unchanged data from a the data table 160 from a previous copy is not to be copied again, copy manager 110 may be configured to skip assigning data files 158 to file groups 159 that contain unchanged data from the data table 160, so that unchanged data is not copied again to the target memory devices 174. These measures may further help ensure that most critical data files 158 are copied to the target memory devices 174.

At operation 414, copy manager 110 schedules a data copy of the re-arranged data file groups 159 to the target memory devices 174 according to the copy queue.

Figure 5:
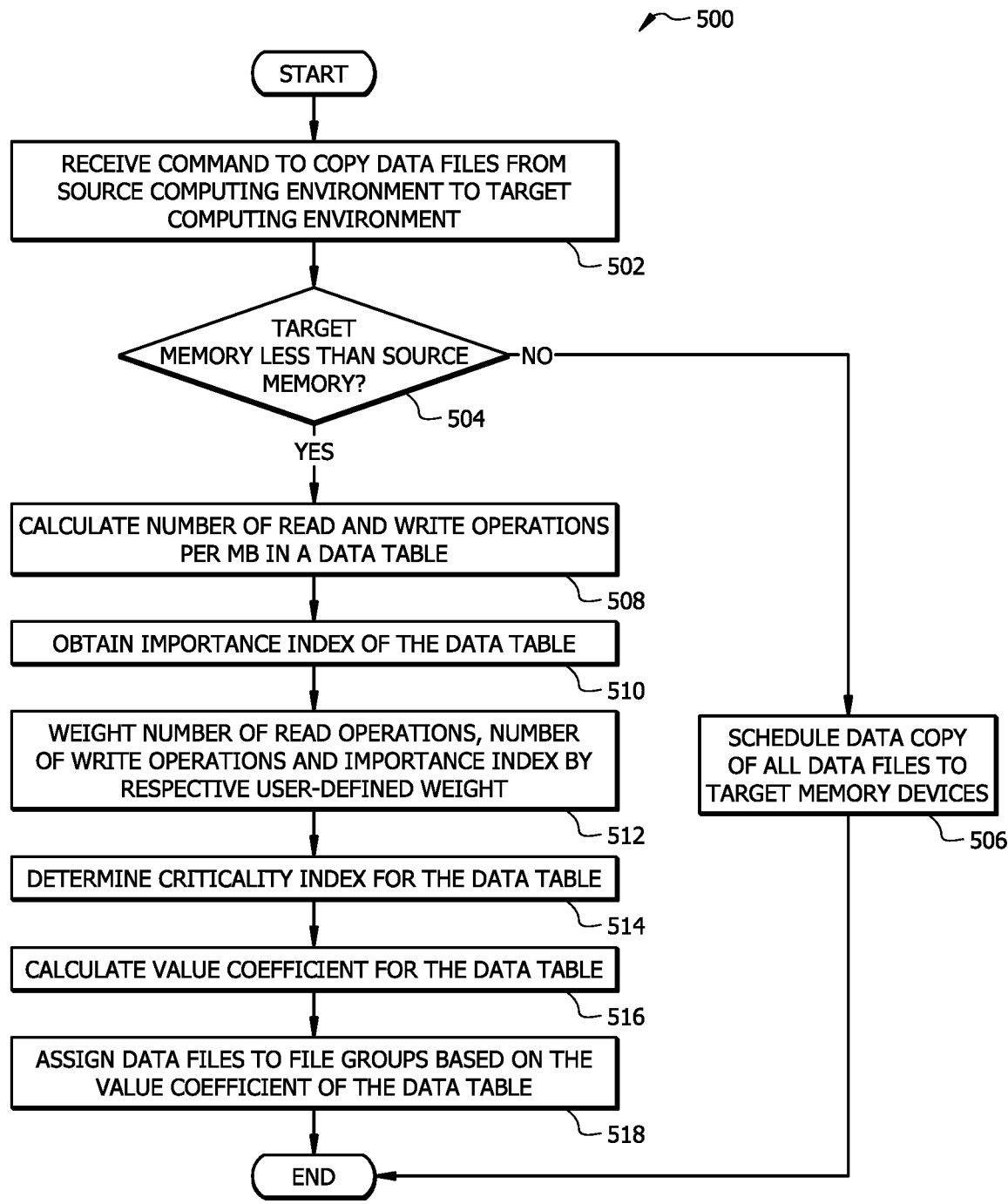
FIG. 5 is a flowchart of an example method for valuating a data table, in accordance with one or more embodiments of the present disclosure.

FIG. 5 is a flowchart of an example method 500 for valuating a data table 160, in accordance with one or more embodiments of the present disclosure. Method 500 may be performed by the copy manager 110 as shown in FIG. 1 and described above.

At operation 502, copy manager 110 receives a command or request to copy a plurality of data files from one or more source memory devices 154 to one or more target memory devices 174.

As described above, the target computing environment 170 may undergo periodic restoration which includes copying data stored in the source memory devices 154 to the target memory devices 174. Each restoration event essentially creates an image of the source computing environment 150 in the target computing environment 170. For example, the source computing environment 150 may be a production environment of an organization and the target computing environment may be a lower level environment such as a development environment or test environment. However, in some cases, the target computing environment 170 may have insufficient storage capacity within the target memory devices 174 to accommodate the entire data stored in the source memory devices 154 during a data copy. Copy manager 110 may be configured to manage a data copy or data restoration from the source computing environment 150 to the target computing environment 170. Copy manager 110 may receive a request for a data restore or data copy from the source computing environment 150 to the target computing environment 170. The request for the data copy may be generated by a user 192 using a user device 190. The user 192 generating the request may be an administrator of the source computing environment 150 and/or the target computing environment 170 or any other user 192 with appropriate credentials to make such a request.

At operation 504, in response to receiving the request for data copy, copy manager 110 may determine whether the target memory devices 174 have sufficient memory space to receive and store the entire database 156 (or otherwise all data) stored in the source memory devices 154. Copy manager 110 may have access to environment metadata 134 including metadata relating to the source computing environment 150 and the target computing environment 170. The environment metadata 134 may include information relating to a size of each of the source memory devices 154, a size of each of the target memory devices 174, a size of each data table 160 of the database 156, and memory space needed in each of the target memory devices 174 for operational purposes. Copy manager 110 may be configured to calculate a total amount of data to be copied from the source memory devices 154 to the target memory devices 174 based on the individual data table sizes of the data tables 160. For example, copy manager 110 may add the sizes of all data tables 160 (e.g., obtained from the environment metadata 134) to determine the total data size to be copied to the target memory devices 174. Copy manager 110 may be configured to determine a combined memory space available at the target memory devices 174 (e.g., when the target memory devices include multiple storage disks) to store data received from the source memory devices 154. For example, copy manager 110 may calculate the available memory at the target memory devices 174 by subtracting the total memory space needed at the target memory devices 174 for operational purposes from the total combined memory space of target memory devices 174. Copy manager 110 may be configured to compare the total data size to be copied from the source memory devices 154 with the total memory space available at the target memory devices 174 to store the data. When the memory space available at the target memory devices 174 is less than the total data size to be copied from the source memory devices 154, copy manager may be configured to determine that the target memory devices 174 have insufficient memory space to receive and store the entire database 156 (or otherwise all data) stored in the source memory devices 154.

When copy manager 110 determines that the target memory devices 174 have sufficient memory space to receive and store the entire database 156 (or otherwise all data) stored in the source memory devices 154, method 500 proceeds to operation 506 where copy manager 110 copies all data files 158 and file groups 159 from the source memory devices 154 to the target memory devices 174. However, when copy manager 110 determines that the target memory devices 174 have insufficient memory space to receive and store the entire database 156 (e.g. the plurality of data files 158 and file groups 159) stored in the source memory devices 154, method 500 proceeds to operation 508.

In response to determining that target memory devices 174 have insufficient memory space to store the entire database 156 (or otherwise all data) stored in the source memory devices 154, copy manager 110 may be configured to assign priorities (e.g., priority index 149 as shown in FIG. 1) to data tables 160 based on pre-defined metrics, and copy data files 158 and file groups 159 relating to the data tables 160 in the order of respective priorities assigned to the data tables 160 starting with data files 158 having data for data tables 160 with the highest assigned priorities. Copy manager 110 may assign priorities to each data table 160 of the database 156 based on a relative importance of the data table 160 (as determined based on the pre-defined metrics) among a plurality of data tables 160 defined for the database 156. This technique may ensure that data relating to the most critical data tables 160 is copied prior to data relating relatively non-critical data tables 160. As further described below, one or more of the pre-defined metrics may be indicative of or can be used to determine the importance of each data table 160 in the context of the target computing environment 170. Each pre-defined metric associated with a data table 160 may have a default value based on the nature of data contained in the data table 160 or a user-defined value to suit particular needs of the target computing environment 170.

Copy manager 110 may have access to a plurality of pre-defined metrics relating to each data table 160. As shown in FIG. 1, the pre-defined metrics may include, but are not limited to, table metadata 112, user-defined metrics 122 and environment metadata 134. Table metadata 112 may include, but is limited to, table interaction statistics 114, table size 115, importance index 116, data lineage repository 118 and query execution history 120. Table interaction statistics 114 relating to a data table 160 may include information regarding an amount of one or more types of interactions performed in relation to the data table 160. For example, table interaction statistics 114 may include a total number of read operations performed in the data table 160 and a total number of write operations performed in the data table 160. Table size 115 may include a size of a data table 160 indicative of a total memory space occupied by the data table 160 in the source memory devices 154. Importance index 116 relating to a data table 160 may be indicative of an importance of the data table 160 in the source computing environment 150. Importance index 116 may include a Key Performance Indicator (KPI) index typically assigned to the data table 160 based on how important the data table is for the source computing environment 150 and/or the target computing environment 170. The terms "importance index" and "KPI" are used interchangeably throughout this disclosure. Data lineage repository 118 may include information relating to how each data table 160 of the database 156 is related to other data tables 160 of the database 156. For example, data lineage information relating to a first data table may indicate that a second data table depends upon the first data table to calculate values relating to at least one data field/data type in the second data table. As described below, data lineage information relating to a data table 160 from the data lineage repository 118 may be used to determine how critical the data table may be for one or more applications in the target computing environment 170. Query execution history 120 relating to a data table 160 may include information relating to queries processing in the data table 160. Copy manager 110 may be configured to derive relations between data tables 160 based on query execution histories 120 relating to the data tables 160. For example, query execution history 120 may indicate that data from several data tables 160 was accessed to process a query, indicating that those data tables 160 are related. In one embodiment, copy manager 110 may be configured to derive relations between data tables 160 based on query execution histories 120 when data lineage repository 118 is unavailable or otherwise does not include data lineage information relating to one or more data tables 160. In addition, table metadata 112 may also include data logs relating to data tables 160 which can also be used to derive data lineage information relating to data tables 160.

User-defined metrics may include, but are not limited to, read weightage 124, write weightage 126, data date range 128, KPI weightage 130 and stale data movement flag 132. Read weightage 124 assigned to a data table 160 may include a numerical weight assigned to read operations performed in the data table 160. Write weightage 126 assigned to a data table 160 may include a numerical weight assigned to write operations performed in the data table 160.

KPI weightage 130 assigned to a data table 160 may include a numerical weight assigned to the importance index 116 (e.g., KPI) of the data table 160. As further described below, each of the read weightage 124, write weightage 126 and KPI weightage 130 decides how much influence the respective metric (e.g., read operations, write operations and KPI respectively) has in deciding the value of a data table 160 in the target computing environment 170. For example, a user 192 of the target computing environment 170 may assign a higher read weightage 124 to read intensive data tables 160 and may assign a higher write weightage 126 to write intensive data tables 160. A user may assign the KPI weightage 130 to adjust the default KPI index assigned to a data table 160. Data date range 128 defined for a data table 160 may include a date range (and/or time range), wherein data from the data table 160 associated with the data range (and/or time range) is to be copied to the target memory devices 174. For example, a data date range 128 defined for a data table 160 containing employee records for an organization, may specify that employee records relating to employee joining dates within the past three months are to be copied to the target memory devices 174. Defining a data date range 128 may be useful especially for large data tables 160 when the target computing environment does not need all data from the data tables 160. For example, when the target computing environment 170 is a lower level environment such as a test environment, all data from a large data table may not be needed to test certain features. In this case, a user 192 of the target computing environment 170 may define a data date range for the data table 160 so that data relating to the data date range can be copied instead of copying the entire data table 160. Stale data movement flag 132 relating to a data table 160 may specify whether data from a data table 160 that has remained unchanged since a previous data copy to the target memory devices 174 is to be copied again in a subsequent data copy to the target memory devices 174. As described above, the target computing environment 170 may undergo periodic data restorations from the source computing environment 150. Typically, a portion of the data stored in the database 156 may have remained unchanged between two data copies. Generally, there is no need to re-copy data from a data table 160 that has remained unchanged since a previous data copy. However, in some cases, the user 192 of the target computing environment 170 may want unchanged data from the data table 160 to be copied again in a subsequent data copy, for example, to record unchanged status of the data over several data copies. In such a case, a user 192 may set the stale data movement flag 132 for the data table 160 to indicate that data from the data table 160 that has remined unchanged since a previous data copy is to be copied again to the target memory devices 174 in a subsequent data copy.

In one embodiment, when one or more of the user-defined metrics 122 are not defined for a data table 160, pre-selected default values are set for the respective user defined metrics 122. For example, when a read weightage 124, write weightage 126 or KPI weightage 130 is not defined by a user 192 for a particular data table 160, default weightages are assigned to these metrics.

Environment metadata 134 may include, but is not limited to, metadata relating to the source computing environment 150 as well as the target computing environment 170. Metadata relating to the source computing environment 150 may include a size of each data table 160. Metadata relating to the target computing environment 170 may include a number of target memory devices 174, size of each target memory device 174, memory space available in the target memory devices 174 to store data and amount of space needed in each target memory device 174 for operational purposes. Copy manager 110 may be configured to determine based on the environment metadata 134 that the target memory devices 174 have insufficient memory space to receive and store the entire database 156 (or otherwise all data) stored in the source memory devices 154.

Copy manager 110 may be configured to determine a plurality of table valuation metrics 136 for each data table 160 based on one or more of the table metadata 112 and the user-defined metrics 122.

At operation 508, copy manager calculates a number of read operations per MB 138 in a data table 160 of a plurality of data tables 160 based on a number of read operations performed in the data table and a table size 115 of the data table 160 The copy manager 110 further calculates a number of write operations per MB 140 in the data table 160 based on a number of write operations performed in the data table 160 and the table size 115 of the data table 160.

As described above, copy manager 110 may be configured to calculate Read per MB 138 for each data table 160 as No. of Read Operations performed in the data table divided by the table size 115 of the data table 160. Copy manager 110 may be configured to calculate Writes per MB 140 for each data table 160 as No. of Write Operations performed in the data table divided by the table size 115 of the data table 160. Copy manager 110 may be configured to obtain the No. of Read Operations and No. of Write Operations performed in the data table 160 from the interaction statistics 114 of the data table 160.

At operation 510, copy manager 110 obtains an importance index 116 assigned to the data table 160, wherein the importance index 116 is indicative of an importance of the data table 160. The importance index 116 may include a KPI assigned to the data table 160.

At operation 512, copy manager 110, weights the number of read operations per MB, the number of write operations per MB and the importance index 116 based on respective user-defined metrics. As described above, copy manager 110 may multiply the number of read operations per MB 138 related to the data table 160 by the read weightage 124, multiply the number of write operations per MB 140 related to the data table 160 by the write weightage 126, and multiply KPI 116 with the KPI weightage 130.

At operation 514, copy manager 110 determines a criticality index 144 for the data table 160 based on a relationship of the data table 160 with other data tables 160 of the database 156.

As described above, copy manager 110 may be configured to calculate a criticality index 144 for each data table 160 based on data lineage information relating to the data table 160. The criticality index 144 of a data table 160 is indicative of how critical the data table 160 is to one or more software applications in the target computing environment 170, based on whether and how many other data tables 160 depend on the data table 160. Copy manager 110 may obtain data lineage information relating to each data table 160 from data lineage repository 118 or may determine the data lineage information from query execution history 120 of the data table 160. For example, for each data table 160, copy manager 110 may be configured to determine whether one or more other data tables 160 depend on the data in the data table 160 for calculating a value of at least one data field. Copy manager 110 may be configured to calculate the criticality index 144 of the data table 160 based on a KPI index 116 of the data table 160 and the criticality index 144 of the one or more other data tables 160 that depend on the data table 160, wherein the criticality index 144 of a data table 160 is higher when one or more other data tables 160 depend on the data table 160 as compared to the criticality index of the data table 160 when no other data tables depend on the data table 160. FIG. 2 illustrates an example calculation of criticality index 144 for data tables 160 based on data lineage information of data tables 160 as described above.

At operation 516, copy manager 110 calculates a value coefficient 147 of the data table 160 by adding the weighted read operations per MB, the weighted write operations per MB, the weighted importance index and the criticality index 144 of the data table 160. Copy manager 110 may be configured to calculate a value coefficient 147 based on one or more of the table valuation metrics 136. FIG. 3A illustrates an example calculation of value coefficients 147 for data tables 160 as described above.

At operation 518, copy manager 110 assigns a data file 158 that includes data relating to the data table 160 to at least one of the file groups 159 based on the value coefficient 147 of the data table 160, wherein a data file 158 that includes data associated with a data table 160 with a higher value coefficient 147 is assigned to one or more file groups 159 that are earlier in a copy queue for copying to the target memory devices 174, wherein the file groups 159 are copied to the target memory devices 174 according to the copy queue.

As described above, once the value coefficients 147 have been calculated for each of the data tables 160, copy manager 110 may be configured to assign a priority index 149 to each data table 160 based on the value coefficient 147 of the data table 160, wherein a higher priority index 149 is assigned to a data table 160 having a higher value coefficient 147. For example, as shown in FIG. 3A, priority indices of 1-5 have been assigned to the data tables A-E, with the highest priority index of "1" assigned to Table D having the highest value coefficient 147 and the lowest priority index of "5" assigned to Table C having the lowest value coefficient 147.

Once a value coefficient 147 and priority index 149 has been determined for each data table 160, copy manager 110 may be configured to schedule copying of the file groups 159 and data files 158 in order of the priority indices 149 assigned to respective data tables 160 starting with data files 158 containing data relating to data tables 160 with the highest assigned priority indices 149. In one embodiment, copy manager 110 may be configured to re-arrange the file groups 159 such that data files 158 containing data relating to data tables 160 with higher priority indices 149 are assigned to file groups 159 scheduled to be copied earlier to the target memory devices 174, and data files 158 containing data relating to data tables 160 with lower priority indices 149 are assigned to file groups 159 scheduled to be copied later to the target memory devices 174. For example, file groups FG1-FGn may be placed in a copy queue in numerical order with FG1 scheduled to be copied first and the FGn scheduled to be copied last. Copy manager 110 may be configured to assign data files 158 to the file groups FG1-FGn based on the priority indices 149 of data tables 160 for which the data files 158 hold data, wherein data files 158 containing data relating to data tables 160 having the highest priority indices 149 are assigned to FG1 and data files 158 containing data relating to data tables 160 having the lowest priority indices 149 are assigned to FGn. Re-arranging the file groups in the copy queue based on the priority indices 149 of the data tables 160 may ensure that the most critical data tables are copied first to the target memory devices 174.

Thus, for example, even when all file groups FG1-FGn cannot be copied to the target memory devices 174 as a result of insufficient storage space in the target memory devices 174, there is a high likelihood that most or all critical data files 158 and corresponding data tables 160 are copied to before the target memory devices 174 runs out of memory. As shown in FIG. 1, target memory devices 174 have received and stored a copy of the database 156 (shown as DB1_copy) with file groups FG1-FGn-x having been copied when the target memory devices 174 run out of memory. In this case, n-x refer to the number of file groups 159 and/or data files 158 that were not copied as a result of insufficient memory space in the target memory devices 174.

In one or more embodiments, when a data date range 128 has been defined for a data table 160, data files 158 that contain data relating to the defined data date range 128 for the data table 160 are prioritized over data files 158 that contain data that is outside the defined data date range 128 for the data table 160. For example, only data files 158 that contain data relating to the defined data date range 128 for the data table 160 are assigned to the file groups 159 based on the priority index 149 of the data table 160, so that data from the data table 160 that is outside the defined data date range 128 is not copied to the target memory devices 174. In additional or alternative embodiments, when the stale data movement flag 132 for a data table 160 is set to indicate that unchanged data from a the data table 160 from a previous copy is not to be copied again, copy manager 110 may be configured to skip assigning data files 158 to file groups 159 that contain unchanged data from the data table 160, so that unchanged data is not copied again to the target memory devices 174. These measures may further help ensure that most critical data files 158 are copied to the target memory devices 174.

Figure 6:
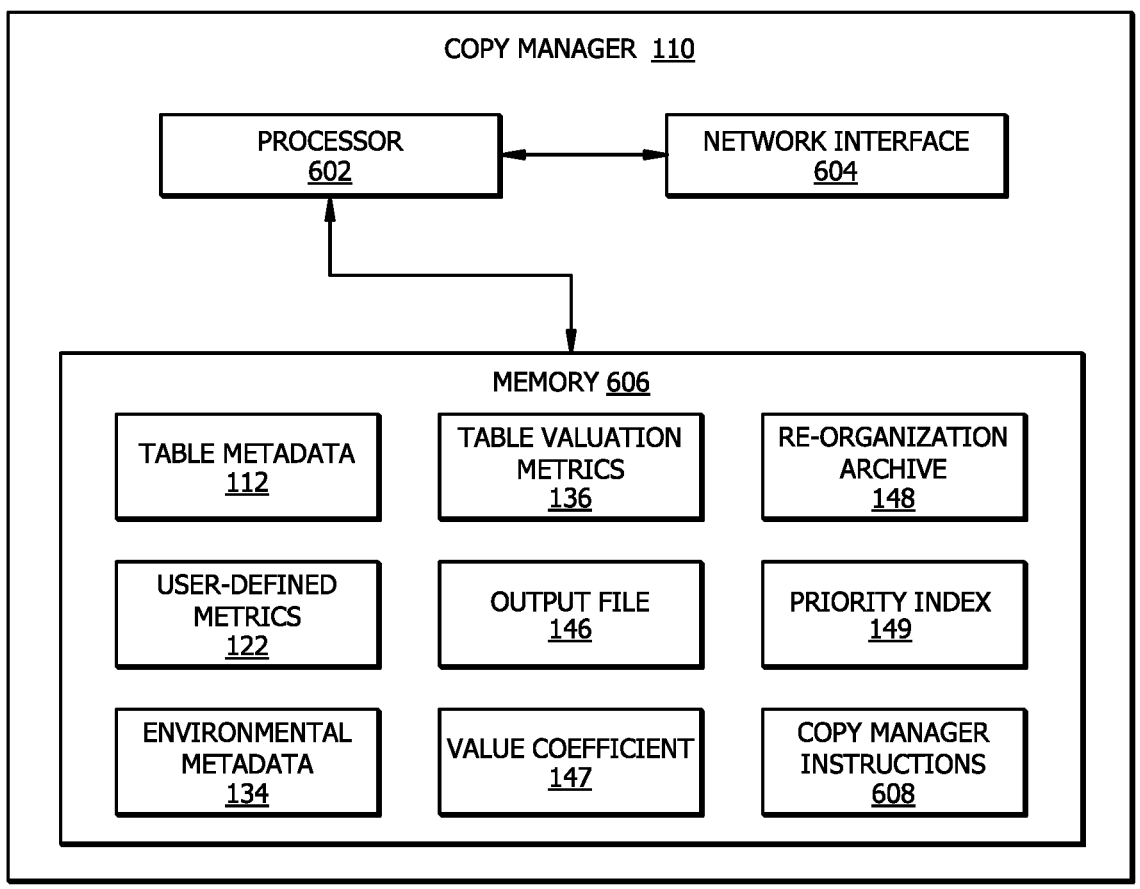
FIG. 6 illustrates an example schematic diagram of the copy manager illustrated in FIG. 1, in accordance with one or more embodiments of the present disclosure.

FIG. 6 illustrates an example schematic diagram 600 of the copy manager 110 illustrated in FIG. 1, in accordance with one or more embodiments of the present disclosure.

Copy manager 110 includes a processor 602, a memory 606, and a network interface 604. The copy manager 110 may be configured as shown in FIG. 6 or in any other suitable configuration.

The processor 602 comprises one or more processors operably coupled to the memory 606. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., copy manager instructions 608) to implement the copy manager 110. In this way, processor 602 may be a special-purpose computer designed to implement the functions disclosed herein. In one or more embodiments, the copy manager 110 is implemented using logic units, FPGAs, ASICs, DSPs, or any other suitable hardware. The copy manager 110 is configured to operate as described with reference to FIGS. 1-5. For example, the processor 602 may be configured to perform at least a portion of the methods 400 and 500 as described in FIGS.. 4 and 5 respectively.

The memory 606 comprises one or more disks, tape drives, or solid-state drives, and may be used as an over-flow data storage device, to store programs when such programs are selected for execution, and to store instructions and data that are read during program execution. The memory 606 may be volatile or non-volatile and may comprise a read-only memory (ROM), random-access memory (RAM), ternary content-addressable memory (TCAM), dynamic random-access memory (DRAM), and static random-access memory (SRAM).

The memory 606 is operable to store the table metadata 112, user-defined metrics 122, environment metadata 134, table valuation metrics 136, output file 146, re-organization archive 148, value coefficients 147, priority indices 149 and the copy manager instructions 608. The copy manager instructions 608 may include any suitable set of instructions, logic, rules, or code operable to execute the copy manager 110.

The network interface 604 is configured to enable wired and/or wireless communications. The network interface 604 is configured to communicate data between the copy manager 110 and other devices, systems, or domains (e.g. source computing environment 150, target computing environment 170, user devices 190 etc.). For example, the network interface 604 may comprise a Wi-Fi interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

It may be noted that each of the source computing environment 150 (or components 152 thereof), target computing environment 170 (or components 172 thereof) and user devices 190 may be implemented similar to the copy manager 110. For example, each of the source computing environment 150 (or components 152 thereof), target computing environment 170 (or components 172 thereof) and user devices 190 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   one or more source memory devices of a source computing environment that store a database comprising a plurality of data files grouped in a plurality of file groups, wherein each of a plurality of data tables defined for the source computing environment includes data from one or more of the data files grouped into one or more of the file groups;
   one or more target memory devices of a target computing environment that store at least a portion of the data files from the one or more source memory devices;
   at least one processor communicatively coupled to the one or more source memory devices and the one or more target memory devices and configured to:
      calculate a number of read operations per megabyte (MB) in a data table of the plurality of data tables based on a number of read operations performed in the data table and a size of the data table indicative of a total memory space occupied by the data table in the one or more source memory devices;
      calculate a number of write operations per MB in the data table based on a number of write operations performed in the data table and the size of the data table;
      obtain an importance index assigned to the data table, wherein the importance index is indicative of an importance of the data table;
      weight the number of read operations per MB based on a user-defined numerical weight for read operations; and
      weight the number of write operations per MB based on a user-defined numerical weight for write operations;
      weight the importance index based on a user-defined weight for the importance index;
      determine a criticality index for the data table based on a relationship of the data table with other data tables of the database;
      calculate a value coefficient of the data table by adding the weighted read operations per MB, the weighted write operations per MB, the weighted importance index and the criticality index of the data table; and
      assign a data file that includes data relating to the data table to at least one of the file groups based on the value coefficient of the data table, wherein a data file that includes data associated with a data table with a higher value coefficient is assigned to one or more file groups that are earlier in a copy queue for copying to the one or more target memory devices, wherein the file groups are copied to the one or more target memory devices according to the copy queue.

2. The system of claim 1, wherein the importance index of the data table comprises a Key Performance Indicator (KPI) index assigned to the data table.

3. The system of claim 2, wherein the at least one processor determines the criticality index for the data table by:
  determining that at least one other data table calculates a value in at least one data field based on data from the data table; and
  calculating the criticality index of the data table based on the KPI index of the data table and a criticality index of the at least one other data table, wherein the criticality index of the data table is higher when one or more other data tables depend on the data table as compared to the criticality index of the data table when no other data tables depend on the data table.

4. The system of claim 3, further comprising:
  a data lineage repository that stores information relating to how the data table is related to the at least one other data table; and
  wherein the at least one processor is configured to determine based on the information from the data lineage repository that the at least one other data table calculates the value in the at least one data field based on the data from the data table.

5. The system of claim 1, wherein the at least one processor is further configured to:
  obtain a data date range defined for the data in the data table; and
  selecting for copying to the one or more target memory devices, the data file that includes the data relating to the data table that is within the data date range.

6. The system of claim 1, wherein the at least one processor is further configured to:
  assign a priority index to the data table based on the calculated value coefficient of the data table, wherein a higher priority is assigned to a data table having a higher value coefficient; and
  assign the data file that includes the data relating to the data table to the at least one file group based on the priority index of the data table, wherein a data file that includes data associated with a data table with a higher priority index is assigned to one or more file groups that are earlier in the copy queue for copying to the one or more target memory devices.

7. The system of claim 1, wherein the at least one processor is further configured to:
  obtain a stale data movement flag for the data table, wherein the stale data movement flag indicates whether data from the data table that has remained unchanged since a previous data copy to the one or more target memory devices is to be copied again in a subsequent data copy to the one or more target memory devices;
  detect that the data file including data relating to the data table includes data that has remained unchanged since the previous data copy to the one or more target memory devices;
  when the stale data movement flag indicates that the unchanged data is to be copied, copy the data file to the one or more target memory devices; and
  when the stale data movement flag indicates that the unchanged data is no to be copied, skip copying the data file to the one or more target memory devices.

8. A method for copying data from a source computing environment to a target computing environment, comprising:
  calculating a number of read operations per megabyte (MB) in a data table of a plurality of data tables based on a number of read operations performed in the data table and a size of the data table, wherein one or more source memory devices of the source computing environment store a database comprising a plurality of data files grouped in a plurality of file groups, wherein each of the plurality of data tables is defined for the source computing environment and includes data from one or more of the data files grouped into one or more of the file groups, wherein the size of the data table is indicative of a total memory space occupied by the data table in the one or more source memory devices;
  calculating a number of write operations per MB in the data table based on a number of write operations performed in the data table and the size of the data table;
  obtaining an importance index assigned to the data table, wherein the importance index is indicative of an importance of the data table;
  weighting the number of read operations per MB based on a user-defined numerical weight for read operations;
  weighting the number of write operations per MB based on a user-defined numerical weight for write operations;
  weighting the importance index based on a user-defined weight for the importance index;
  determining a criticality index for the data table based on a relationship of the data table with other data tables of the database;
  calculating a value coefficient of the data table by adding the weighted read operations per MB, the weighted write operations per MB, the weighted importance index and the criticality index of the data table; and
  assigning a data file that includes data relating to the data table to at least one of the file groups based on the value coefficient of the data table, wherein a data file that includes data associated with a data table with a higher value coefficient is assigned to one or more file groups that are earlier in a copy queue for copying to one or more target memory devices of the target computing environment, wherein the file groups are copied to the one or more target memory devices according to the copy queue.

9. The method of claim 8, wherein the importance index of the data table comprises a Key Performance Indicator (KPI) index assigned to the data table.

10. The method of claim 9, wherein determining the criticality index for the data table comprises:
  determining that at least one other data table calculates a value in at least one data field based on data from the data table; and
  calculating the criticality index of the data table based on the KPI index of the data table and a criticality index of the at least one other data table, wherein the criticality index of the data table is higher when one or more other data tables depend on the data table as compared to the criticality index of the data table when no other data tables depend on the data table.

11. The method of claim 10, wherein:
  a data lineage repository stores information relating to how the data table is related to the at least one other data table; and
  further comprising determining based on the information from the data lineage repository that the at least one other data table calculates the value in the at least one data field based on the data from the data table.

12. The method of claim 8, further comprising:
  obtaining a data date range defined for the data in the data table; and selecting for copying to the one or more target memory devices, the data file that includes the data relating to the data table that is within the data date range.

13. The method of claim 8, further comprising:
assigning a priority index to the data table based on the calculated value coefficient of the data table, wherein a higher priority is assigned to a data table having a higher value coefficient; and
assigning the data file that includes the data relating to the data table to the at least one file group based on the priority index of the data table, wherein a data file that includes data associated with a data table with a higher priority index is assigned to one or more file groups that are earlier in the copy queue for copying to the target one or more memory devices.

14. The method of claim 8, further comprising:
obtaining a stale data movement flag for the data table, wherein the stale data movement flag indicates whether data from the data table that has remained unchanged since a previous data copy to the one or more target memory devices is to be copied again in a subsequent data copy to the one or more target memory devices;
detecting that the data file including data relating to the data table includes data that has remained unchanged since the previous data copy to the one or more target memory devices;
when the stale data movement flag indicates that the unchanged data is to be copied, copying the data file to the one or more target memory devices; and
when the stale data movement flag indicates that the unchanged data is no to be copied, skipping copying the data file to the one or more target memory devices.

15. A non-transitory computer-readable medium for copying data from a source computing environment to a target computing environment, the computer-readable medium storing instructions which when executed by a processor perform a method comprising:
calculating a number of read operations per megabyte (MB) in a data table of a plurality of data tables based on a number of read operations performed in the data table and a size of the data table, wherein one or more source memory devices of the source computing environment store a database comprising a plurality of data files grouped in a plurality of file groups, wherein each of the plurality of data tables is defined for the source computing environment and includes data from one or more of the data files grouped into one or more of the file groups, wherein the size of the data table is indicative of a total memory space occupied by the data table in the one or more source memory devices;
calculating a number of write operations per MB in the data table based on a number of write operations performed in the data table and the size of the data table;
obtaining an importance index assigned to the data table, wherein the importance index is indicative of an importance of the data table;
weighting the number of read operations per MB based on a user-defined numerical weight for read operations;
weighting the number of write operations per MB based on a user-defined numerical weight for write operations;
weighting the importance index based on a user-defined weight for the importance index;
determining a criticality index for the data table based on a relationship of the data table with other data tables of the database;
calculating a value coefficient of the data table by adding the weighted read operations per MB, the weighted write operations per MB, the weighted importance index and the criticality index of the data table; and
assigning a data file that includes data relating to the data table to at least one of the file groups based on the value coefficient of the data table, wherein a data file that includes data associated with a data table with a higher value coefficient is assigned to one or more file groups that are earlier in a copy queue for copying to the one or more target memory devices of the target computing environment, wherein the file groups are copied to the one or more target memory devices according to the copy queue.

16. The non-transitory computer-readable medium of claim 15, wherein the importance index of the data table comprises a Key Performance Indicator (KPI) index assigned to the data table.

17. The non-transitory computer-readable medium of claim 16, wherein determining the criticality index for the data table comprises:
determining that at least one other data table calculates a value in at least one data field based on data from the data table; and
calculating the criticality index of the data table based on the KPI index of the data table and a criticality index of the at least one other data table, wherein the criticality index of the data table is higher when one or more other data tables depend on the data table as compared to the criticality index of the data table when no other data tables depend on the data table.

18. The non-transitory computer-readable medium of claim 17, wherein:
a data lineage repository stores information relating to how the data table is related to the at least one other data table; and
further comprising instructions for determining based on the information from the data lineage repository that the at least one other data table calculates the value in the at least one data field based on the data from the data table.

19. The non-transitory computer-readable medium of claim 15, further comprising instruction for:
obtaining a data date range defined for the data in the data table; and
selecting for copying to the one or more target memory devices, the data file that includes the data relating to the data table that is within the data date range.

20. The non-transitory computer-readable medium of claim 15, further comprising instructions for:
assigning a priority index to the data table based on the calculated value coefficient of the data table, wherein a higher priority is assigned to a data table having a higher value coefficient; and
assigning the data file that includes the data relating to the data table to the at least one file group based on the priority index of the data table, wherein a data file that includes data associated with a data table with a higher priority index is assigned to one or more file groups that are earlier in the copy queue for copying to the one or more target memory devices.

* * * * *